Dec. 9, 1958
D. V. COMBS
2,863,480
MEAT GRINDING APPARATUS
Filed Nov. 27, 1956
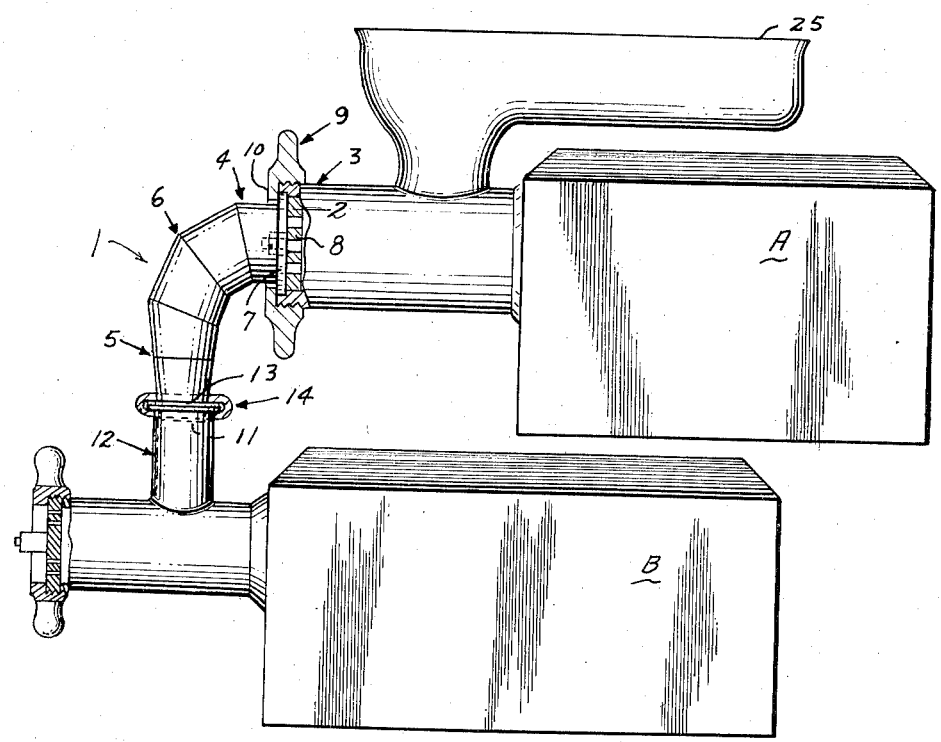
Fig-1
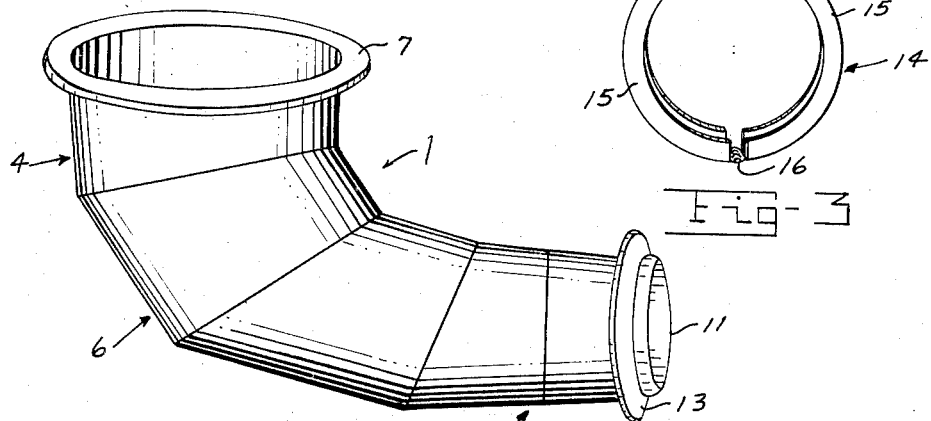
Fig-2
Fig-3
INVENTOR.
DOUGLAS V. COMBS
BY
AND
HIS ATTORNEYS

United States Patent Office 2,863,480
Patented Dec. 9, 1958

2,863,480

MEAT GRINDING APPARATUS

Douglas V. Combs, Fairborn, Ohio

Application November 27, 1956, Serial No. 624,689

6 Claims. (Cl. 146—78)

(Granted under Title 35, U. S. Code (1952), sec. 266)

The invention described herein may be manufactured and used by or for the Government for governmental purposes without the payment of any royalty thereon.

This invention relates to meat grinding apparatus, and more particularly to a novel adapter for connecting meat grinders in tandem whereby to effect improvements and economies in the meat grinding process and provide a meat product of an improved nature.

The general equipment available in the meat grinding art requires that meats be run through a grinder twice in order to effect the proper consistency and mixture of lean and fat meats to give it consumer appeal. Ground meat is a very perishable item. The prior means and methods of processing ground meat products involves considerable manual handling of the meat. The meat is generally first cut into chunks and hand fed to a grinder having a coarse grind plate. Then the grinder must be disassembled to replace the coarse grind plate with a fine grind plate. This involves delay and consumes time. The meat is meanwhile exposed to the air and must be manually handled again to introduce it to the grinder for fine grinding. If two grinders are employed the delay is shorter but the meat must be manually handled to get it from the coarse grinder to the fine grinder. This successive handling and exposure of the meat causes the meat to absorb heat with resultant discoloration and increase in its perishability. The process requires two to three employees to a machine and results in little more than 276 pounds of finished ground meat products per hour employing standard machines. Also, the excessive handling involved makes it vital that the meat be disposed of in a relatively short period of time. Many times this results in financial loss.

The subject invention was developed to eliminate the above noted problems present in the use of available meat grinding equipment. The invention provides an adapter tube for connecting the outlet of a coarse grinder to the feed inlet of a fine grinder so that a continuous flow ground meat processing device is provided. The ground meat is thus reduced to an edible, attractive product with minimum handling. The adapter is so designed to receive the coarse ground meat and automatically induce a positive pressured accelerated feed thereof to and into the fine grinder. The exposure of the meat to the air is negligible and meat production capacity per man hour is considerably multiplied.

An object of the invention is to provide meat grinding equipment producing considerable improvement and economy in the meat grinding process.

Another object of the invention is to provide a device for connecting meat grinders in tandem whereby to effect a continuous flow ground meat processing apparatus reducing the handling of the meat to a minimum.

Another object of the invention is to provide improved means for connecting meat grinders to automatically induce a positive continuous flow of ground meat therebetween.

A further object of the invention is to provide means for expediting the meat grinding process which cuts down discoloration and perishability of the ground meat in process.

An additional object of the invention is to provide a device for connecting meat grinders in tandem and insuring a positive continuous flow of ground meat therebetween which multiplies the production capacity per grinder to a considable extent.

Another object of the invention is to provide a device for connecting meat grinders in tandem possessing the structural advantages, the inherent meritorious characteristics and the mode of operation herein described.

With the above and other objects in view, as will more fully appear in the specification, the invention intended to be protected by Letters Patent consists of the features of construction, the parts and combinations thereof, and the mode of operation hereinafter described or illustrated in the accompanying drawings, or their equivalents.

Referring to the drawings wherein is illustrated one, but obviously not necessarily the only form of embodiment of the invention;

Fig. 1 schematically illustrates the application of the invention to place meat grinders in tandem;

Fig. 2 is a detail perspective view of the adapter connecter employed in Fig. 1; and Fig. 3 is a detail view of the clamp means employed in the application of the device of Fig. 2 to the meat grinders in Fig. 1.

The invention can best be described with reference to an illustrative embodiment. An adapter 1 as provided by the invention is shown in Fig. 1 of the drawings connecting meat grinders A and B in tandem. The grinders are schematically shown since the specific operating details thereof are not pertinent to the present invention. The grinder A which is vertically elevated relative the grinder B is provided with a coarse grind plate 2 in its head or outlet 3 while grinder B is provided with a fine grind plate. In this way continuous complete processing apparatus for effecting finished ground meat products is provided. This eliminates intermediate handling and unnecessary exposure of the meat in the process.

The adapter 1 is tubular in nature and, as shown, is formed of stainless steel tube elements welded together. It includes a receiving section 4 and a feed transfer section 5 connected by a 45° elbow unit 6 to dispose the receiving section 4 at substantially right angles to the feed transfer section 5. The receiving section 4 is provided with a peripheral flange 7 about its outer extremity which seats in the head of grinder A and to the coarse grind plate 8 therein, about its outer edge. The flange 7 and accordingly the adapter 1 is clamped in fixed relation to plate 8 within the head of grinder A by the adjustable clamping collar 9. The collar 9 has an internal flange 10 which seats over the flange 7 as the collar 9 threadedly engages about the grinder head. Thus the section 4 is arranged to define the outlet from the grinder A and is substantially sealed thereabout.

The feed transfer section 5 connects to form an extension of section 4 by means of welded tube elements forming a 45° elbow 6 therebetween. From the elbow 6 the connected tube elements of the feed transfer section 5 are tapered to gradually decrease the cross-sectional area of the adapter 1 to the outlet end 11. This outlet 11, as shown, depends within the feed inlet 12 of the fine grinder B to engage its outer surface to the inner wall thereof. Adjacent and spaced from the outlet end 11, the feed transfer section 5 is provided with an external flange 13 which seats over the lip of the feed inlet 12 as the end 11 of the adapter depends therein. A split ring or collar type clamp 14 is fixed about the lip of the feed inlet and the flange 13 on the adapter 1 to contain them and form a seal between the adapter 1 and the feed inlet 12. The clamp 14 consists of mating semi-circular clamp elements 15 connected by a hinge 16 to one end. The clamp elements 15 are U-shaped in cross-section to contain the lip of the feed inlet and flange 13. The adjacent free ends of elements 15 are respectively provided with a bifurcated radial projection 17 and a pair of radially projecting parallel plates 18 transversely connected by a pin 19 pivotally mounting a threaded bolt 20 thereto. As the free ends of the clamp abut together to seal the flange 13 to the lip of the feed inlet 12, the bolt on one element 15 is swung between the bifurcation 17 on the other end and a wing nut 21 on the bolt is adjusted to clamp to the projection 17.

Thus, a completely sealed meat transfer device 1 is provided between the head of grinder A and the feed inlet of grinder B.

In the employment of the processing apparatus provided by the invention, chunks of meat are introduced into the feed tray 25 of grinder A. The operation of the grinder A causes a coarse ground meat to be fed through the coarse grind plate 8 into the receiving section 4 of the adapter 1. The seal between the adapter and the head of the grinder A insures complete uninterrupted flow of the coarse ground meat into the adapter. The section 4 and the adjacent elbow section 6 have the maximum internal cross-sectional area of the tubular adapter 1 to essentially effect a pressure section therein, while the feed transfer section 5 is gradually reduced in cross-sectional area for flow acceleration therethrough. The relative dimensioning of the adapter 1 causes a pressure head to be built up as the meat flows from grinder A into the receiving section 4. The meat is forced thereby in accelerated fashion through the gradually reduced feed transfer section 5 under the influence of this pressure head to positively feed the coarse ground meat to the feed inlet of the feed grinder B. The particular sealing of the adapter at its outlet 11 prevents loss of pressure head due to leaking of the meat between the flange 13 and the lip of the feed inlet 12. The chunks of meat are accordingly continuously and positively fed in accelerated fashion after introduction in grinder A to effect a continuous uninterrupted processing including a coarse grind and a fine grind thereof to produce finished edible product of fine consistency having consumer eye appeal. The exposure and handling of the meat is reduced to a minimum as is readily obvious and the production capacity of the machines which normally depend on human factors is substantially doubled due to the continuous positive pressured flow of the meat as provided between the grinders A and B by the adapter 1.

Many benefits derive from the invention apparatus thus provided. In comparison to the instances where only one grinder was previously employed, considerable time is saved in the processing of the ground meats due to the fact that it is not necessary to disassemble the grinder to change plates. The invention reduces the number of times meat must be manually handled to a minimum and accordingly reduces its perishability and the usual discoloration attendant the meat processing. The meat is only exposed for introduction into the grinder A and for immediate removal upon completion of the processing by the grinder B. As is readily obvious, many man hours of work are saved per unit production of the ground meat products. This enables the reduction in the number of employees necessary for the meat processing. Of course, the minimum handling and exposure of the meat in the process produces a product having considerable eye appeal for the consumer.

The invention has been described with considerable particularity in an illustrative manner herein. It will be readily obvious to those versed in the art that many modifications in material and application may be made without departing from the spirit of the invention.

From the above description it will be apparent that there is thus provided a device of the character described possessing the particular features of advantage before enumerated as desirable which obviously is susceptible of modification in its form, proportions, detail construction, and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises an illustrative form of several modes of putting the invention into effect and the invention is therefore claimed in any of its forms or modifications within the legitimate and valid scope of the appended claims.

Having thus described my invention, I claim:

1. In combination with a pair of meat grinders, each having means defining a feed inlet thereto and an outlet therefrom, an adapter for connecting said grinders in series relation, said adapter including means at one end nesting in sealing relation about the outlet of one of said grinders to receive ground meat processed therethrough, means mounting the other end of said adapter in nested relation to the feed inlet of said other grinder, means engaging said mounting means and said means defining the feed inlet of said other grinder to provide a seal therebetween, said adapter being formed to diminish in cross sectional area adjacent the feed inlet of said other grinder whereby meat may be processed for table use in a single pass through said grinders.

2. In combination, a pair of meat grinders, each having means defining a feed inlet thereto and an outlet therefrom, a generally tubular element having adapter means at one end nesting in sealing relation about the outlet of one of said grinders and further adapter means at its other end nesting in sealing relation about the inlet to the other of said grinders, said tubular element having a section adjacent said one grinder providing means for developing a pressure head on the meat fed thereto from said one grinder, the other end of said element being relatively reduced adjacent said other grinder for providing an accelerated pressured flow of ground meat from one grinder to the other for continuous processing thereof to a table product.

3. In combination, a pair of meat grinders, each having means defining a feed inlet thereto and an output therefrom, a flow channeling member sealingly related at its ends to the means defining the outlet of one of said grinders and the means defining the inlet of the other of said grinder to provide a sealed transfer passage for continuous delivery of meat from said one of said grinders to the other, said flow channeling member including a pressure section and a flow accelerating section at its respective end portions and a flow diverting section intermediate said pressure section and said flow accelerating section whereby meat ground in said one grinder will be delivered in pressured accelerated fashion to the other for continuous automatic processing thereof to a condition for table use.

4. In combination, a pair of meat grinders, each having means defining a feed inlet thereto and an outlet therefrom, a continuous wall structure having an external flange at one end seating in sealing relation about the means defining the outlet from one of said grinders and forming a continuation thereof, a flange adjacent and spaced inwardly of the other end of said continuous wall structure seating on the means providing the feed inlet of the other grinder and nesting said other end of said structure wall within the feed inlet of said other grinder for maintaining a full pressured flow of ground meat from one grinder to the other for successive grinding thereof, said continuous wall structure being internally reduced in cross sectional configuration adjacent said other grinder to induce an acceleration of meat delivered to said other grinder.

5. Continuous flow apparatus for effecting a complete processing of ground meat for table use comprising, a first meat grinder having means defining an outlet therefrom and a coarse grind plate in said outlet, a second meat grinder, means defining a feed inlet in said second grinder, means defining a feed outlet in said second grinder having a fine grind plate therein, a flow channeling member having one end mounted in the outlet of said first grinder in connected relation thereto, said flow channeling member having its other end sealingly connected to the inlet in said second grinder, said flow channeling member progressively decreasing in cross-sectional area from one end to the other to establish a pressure head on the ground meat introduced therein from said first grinder to maintain a continuous positive accelerated flow thereof into the inlet of said second grinder.

6. In combination with a pair of meat grinders, each having means defining a feed inlet thereto and an outlet therefrom, an adapter connecting said meat grinders in tandem to provide a closed pressured meat transfer conduit therebetween including a continuous wall structure of an elongated nature having a 45 degree bend intermediate the ends thereof, one end of said adapter having a peripheral flange seating about the means defining the outlet in one of said grinders and the other end of said adapter being reduced in dimension in graduated fashion and having a peripheral flange externally thereof in spaced relation to its extremity for seating on the means defining the feed inlet to said other grinder and a clamp containing said second mentioned flange for maintaining said second flange in sealed relation to the means defining the feed inlet in said other grinder.

References Cited in the file of this patent

UNITED STATES PATENTS

| 1,215,451 | White | Feb. 13, 1917 |
| 1,780,067 | Cox | Oct. 28, 1930 |
| 2,281,609 | Walter | May 5, 1942 |

FOREIGN PATENTS

| 64,444 | Norway | Feb. 9, 1942 |